United States Patent [19]
Keidl et al.

[11] Patent Number: 5,617,007
[45] Date of Patent: Apr. 1, 1997

[54] BATTERY CHARGING METHOD AND APPARATUS USING CURRENT CONTROL

[75] Inventors: Steven D. Keidl; Jeffrey S. Rotter; Steven W. Steele, all of Rochester, Minn.

[73] Assignee: International Business Machines Corporation, Armonk, N.Y.

[21] Appl. No.: 291,990

[22] Filed: Aug. 17, 1994

[51] Int. Cl.$^6$ .............................. H02J 7/00; H01M 10/44
[52] U.S. Cl. .................................. 320/22; 320/21; 320/23
[58] Field of Search ................................. 320/21, 22, 23, 320/24, 30–32, 39

[56] References Cited

U.S. PATENT DOCUMENTS

| | | |
|---|---|---|
| 3,755,729 | 8/1973 | Kuttner . |
| 3,963,976 | 6/1976 | Clark ............................ 320/21 |
| 4,052,656 | 10/1977 | Lavell et al. ..................... 320/23 |
| 4,217,533 | 8/1980 | Van Beek ........................ 320/23 |
| 4,371,826 | 2/1983 | Shelly . |
| 4,536,696 | 8/1985 | Ray . |
| 4,609,861 | 9/1986 | Inaniwa et al. ................... 320/32 |
| 5,049,804 | 9/1991 | Hutchings ........................ 320/23 |
| 5,166,595 | 11/1992 | Leverich . |
| 5,204,611 | 4/1993 | Nor et al. ........................ 320/21 |
| 5,237,259 | 8/1993 | Sanpei ............................. 320/23 |
| 5,289,101 | 2/1994 | Furuta et al. ..................... 320/21 |
| 5,296,797 | 3/1994 | Bartlett .......................... 320/21 |
| 5,365,160 | 11/1994 | Leppo et al. ..................... 320/22 |
| 5,367,244 | 11/1994 | Rose et al. ...................... 320/23 |
| 5,408,170 | 4/1995 | Umetsu et al. ................... 320/39 |
| 5,412,306 | 5/1995 | Meadows et al. ................ 320/22 |
| 5,442,274 | 8/1995 | Tamai ............................. 320/23 |
| 5,561,360 | 10/1996 | Ayres et al. ................... 320/23 X |

*Primary Examiner*—Peter S. Wong
*Assistant Examiner*—K. Shin
*Attorney, Agent, or Firm*—Joan Pennington

[57] ABSTRACT

A battery charging aparatus and method are provided for charging a battery using current control with a switching power supply charging circuit coupled to the battery. During a first charging phase, a predetermined constant charging current is applied to the battery. The battery voltage is monitored and a second charging phase is started when the battery voltage reaches a predetermined threshold voltage. During a second charging phase, a sequence of stepwise decreasing-amplitude current pulses are applied to the battery. The envelope for the decreasing current pulses is exponential which is characteristic of the current for voltage controlled charging methods. The battery voltage is maintained at a temperature compensated target with a 1% tolerance. The charging current is compared to a predetermined minimum amplitude value and a third charging phase is started when the sequential charging current pulse equals the predetermined minimum amplitude value. During a third charging phase, predetermined charging current pulses having the predetermined minimum amplitude value are applied to the battery. The battery voltage is maintained at a temperature compensated target with a 1% tolerance.

7 Claims, 7 Drawing Sheets

BATTERY CHARGING METHOD AND APPARATUS USING CURRENT CONTROL

BACKGROUND OF THE INVENTION

1. Field of the Invention

The invention relates generally to battery charging systems, and more particularly to a battery charging method and apparatus for charging lead acid batteries.

2. Description of the Prior Art

In order to charge lead acid batteries in an efficient and timely manner, a three phase charging process consisting of constant current charge, constant voltage charge and float voltage charge advantageously is used.

FIG. 4 shows typical voltage and current profiles of a known three phase battery charger. Phase 1 is the constant current phase. In phase 1 the traditional battery charger forces a constant current into the battery by setting a reference in the charger current control loop and feeding the battery input current into the charger control loop. During phase 1, the battery voltage increases as more charge is put into the battery. When the battery voltage reaches a predetermined value, VC, the battery charger ends the constant current charging phase and enters phase 2, the constant voltage charge phase. At the end of phase 1, the battery is nominally 85% charged.

In phase 2, the traditional battery charger will shift from forcing constant current into the battery to regulating the battery voltage at VC +/-1%. This is accomplished by setting a reference in the charger voltage control loop and feeding back the battery voltage into the charger feedback loop. During phase 2 charging, traditional battery chargers disconnect the battery input current from the charger control loop. In phase 2 charging, the battery input current decreases exponentially because the amount of charge required to keep the battery voltage at VC decreases. When the current entering the battery reaches a predetermined value, IX, typically about 1/10 of the phase 1 current, the battery charger ends constant voltage charging and begins float voltage charging or phase 3. At the end of the phase 2, constant voltage charges the battery to 100% charged.

In phase 3, the traditional battery charger continues to regulate the battery voltage, but now the regulation is at a second predetermined voltage Vf that is usually lower than VC from phase 2 constant voltage charging. Implementation of the charger control loop is identical to phase 2 implementation. The purpose of phase 3 charging is to offset the battery's self-discharging mechanism and the amount of current discharged in the battery pack circuits. Phase 3 charging will continue uninterrupted until the battery is discharged by a system request for energy back-up.

In the constant voltage phase 2 and float charging phase 3 the battery voltage must be regulated. In the known prior art arrangement, the battery voltage was regulated by connection to an analog feedback loop of a switching power supply. The analog feedback loop provides feedback in real time.

Due to the nature of lead acid batteries, traditional battery chargers can become unstable during phase 2 and phase 3 charging. Controlling the voltage of a lead acid battery with a switching power supply charger creates stability problems for the charger feedback loop. A battery is very slow to react to changes in charge rates. This results in a large phase lag to the charger control loop. Compensation for this phase lag can be provided in the charger feedback loop design if the battery circuit characteristics do not change significantly. However, lead acid battery circuit characteristics change appreciably with battery charge state, battery age and battery temperature. These changes are not completely predictable. As a result the known battery charger control loop can become unstable. An unstable battery charger control loop will result in batteries not being charged to the correct specifications and can shorten battery life in the field.

A need exists for a method and apparatus that prevents an unstable battery control loop and that is simple to implement.

SUMMARY OF THE INVENTION

A principal object of the present invention is to provide an improved method and apparatus for charging a battery that avoids instability in a battery charger control loop. Other objects are to provide such method and apparatus capable of reliable, effective and efficient operation, and that overcome disadvantages of prior art arrangements.

In brief, the objects and advantages of the present invention are achieved by a battery charging apparatus and method for charging a battery using current control with a switching power supply charging circuit coupled to the battery. During a first charging phase, a predetermined constant charging current is applied to the battery. The battery voltage is monitored and a second charging phase is started when the battery voltage reaches a predetermined threshold voltage. During a second charging phase, a sequence of stepwise decreasing-amplitude current pulses are applied to the battery. The charging current is compared to a predetermined minimum amplitude value and a third charging phase is started when the sequential charging current pulse equals the predetermined minimum amplitude value. During a third charging phase, predetermined charging current pulses having the predetermined minimum amplitude value are applied to the battery.

BRIEF DESCRIPTION OF THE DRAWING

The present invention together with the above and other objects and advantages may best be understood from the following detailed description of the embodiment of the invention illustrated in the drawings, wherein.

DETAILED DESCRIPTION OF THE PREFERRED EMBODIMENT

In accordance with the present invention, an efficient method for charging batteries is provided. A lead acid battery is charged in a constant voltage charging phase 2 and a float voltage charging phase 3 using charge current feedback to a switching power supply charging circuit and using analog/logic circuits or a microprocessor to monitor the battery voltage for turning on and off the charging circuit when the battery voltage reaches critical targets.

Figure 1:
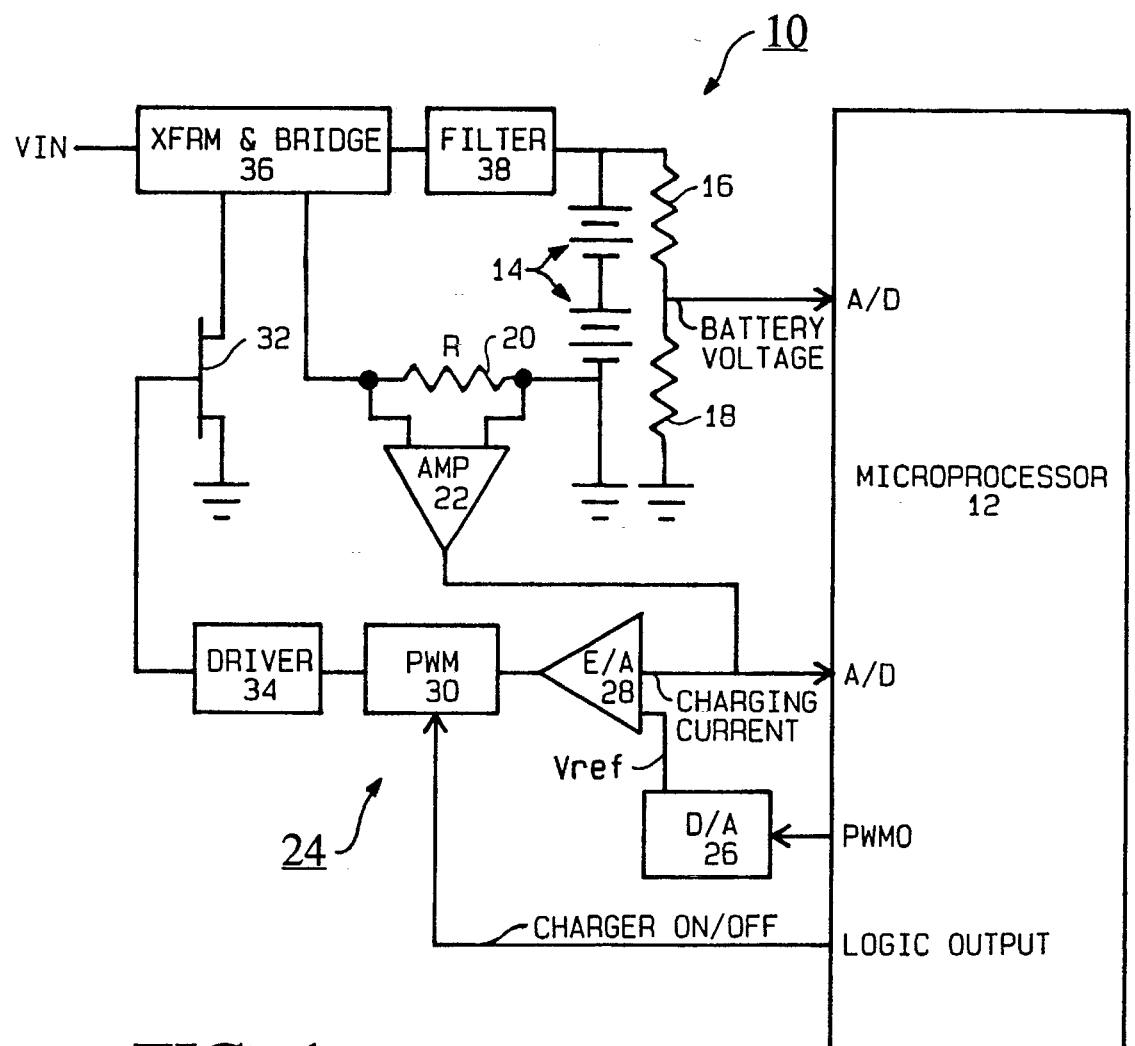
FIG. 1 is a block diagram representation of a battery charging apparatus embodying the invention.

In FIG. 1, there is shown a block diagram of a current controlled charging circuit of the present invention generally designated by the reference character 10. Current controlled charging circuit 10 includes a microprocessor 12 for performing logic and control functions for charging a battery 14 using current control. Microprocessor 12 is suitably programmed to perform the method of the invention as illustrated and described with respect to FIGS. 2A–2E. A signal representative of battery voltage, indicated at a line labeled BATTERY VOLTAGE, provided by a voltage divider pair of resistors 16 and 18, is applied to an analog-to-digital (A/D) port of the microprocessor 12. The battery voltage signal is used to identify when battery 14 reaches predefined critical target voltages. A signal representative of battery charging current indicated at a line labeled CHARGING CURRENT is sensed with a resistor (R) 20 in series with the battery 14, scaled by an amplifier 22 and applied to the feedback loop of a high-frequency switching power supply charging circuit generally designated by the reference character 24. The charging current representative signal is applied to a second analog-to-digital (A/D) input of the microprocessor 12 and used to identify whether the charging circuit 24 is functioning properly. Microprocessor 12 provides a pulse-width-modulated output (PWMO) that is applied to a digital-to-analog (D/A) converter 26. The D/A converter 26 generates a reference voltage (Vref) that is compared with the charging current representative signal by an error amplifier (E/A) 28 of the charging circuit 24. The output of the error amplifier 28 applied to a pulse-width-modulator (PWM) 30 is proportional to the difference between Vref and the charging current representative signal. The output of PWM 30 is coupled to a field effect transistor (FET) 32 via a driver 34. The PWM 30 determines the duty cycle of the charging power supply circuit 24 for controlling current flow to the battery 14 by switching the FET 32 on and off. Current to the battery 14 is provided through a transformer and bridge 36 and a filter 38 operatively controlled by the FET 32. Microprocessor 12 provides a logic output indicated at a line labeled CHARGER ON/OFF applied to PWM 30 for turning on and off the charging circuit 24.

Referring to FIGS. 2A–2E, sequential steps of the method of the invention are shown for charging lead acid batteries. Referring also to FIG. 3, a chart shows the typical voltage and current profiles of the current controlled battery charging circuit 10.

Figure 2A:
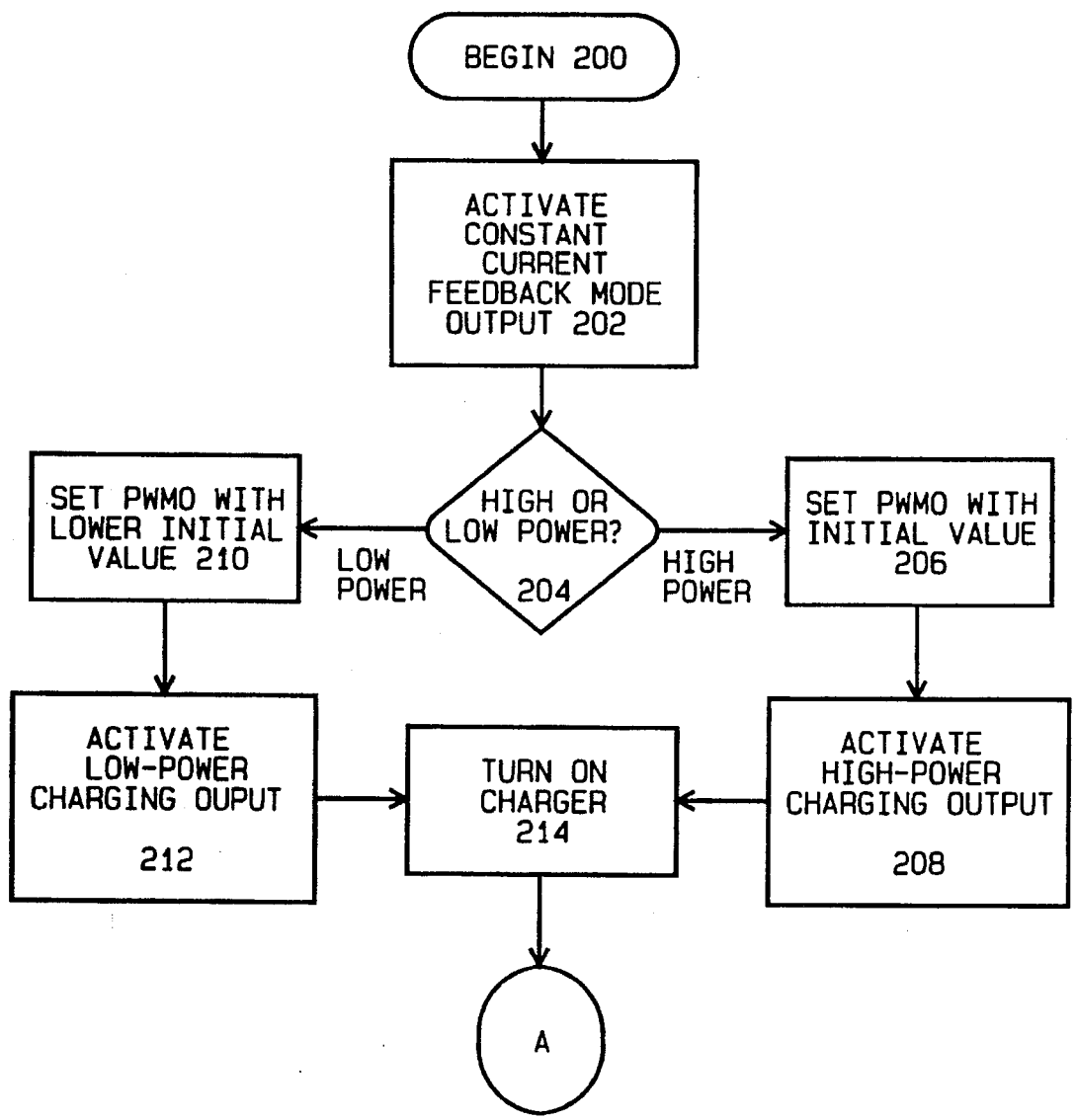
FIGS. 2A, 2B, 2C, 2D and 2E together provide a flow chart of sequential steps performed by the battery charging apparatus of FIG. 1 in accordance with a method of the invention.
Figure 3:
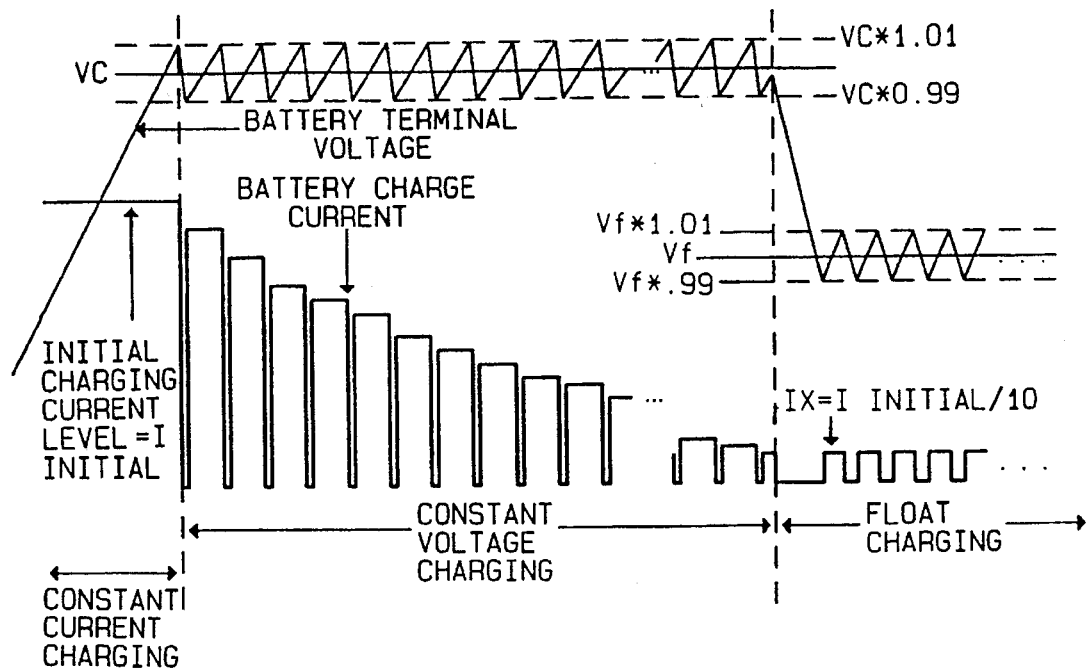
FIG. 3 is a chart showing sequential operations of the battery charging apparatus of FIG. 1.
Figure 4:
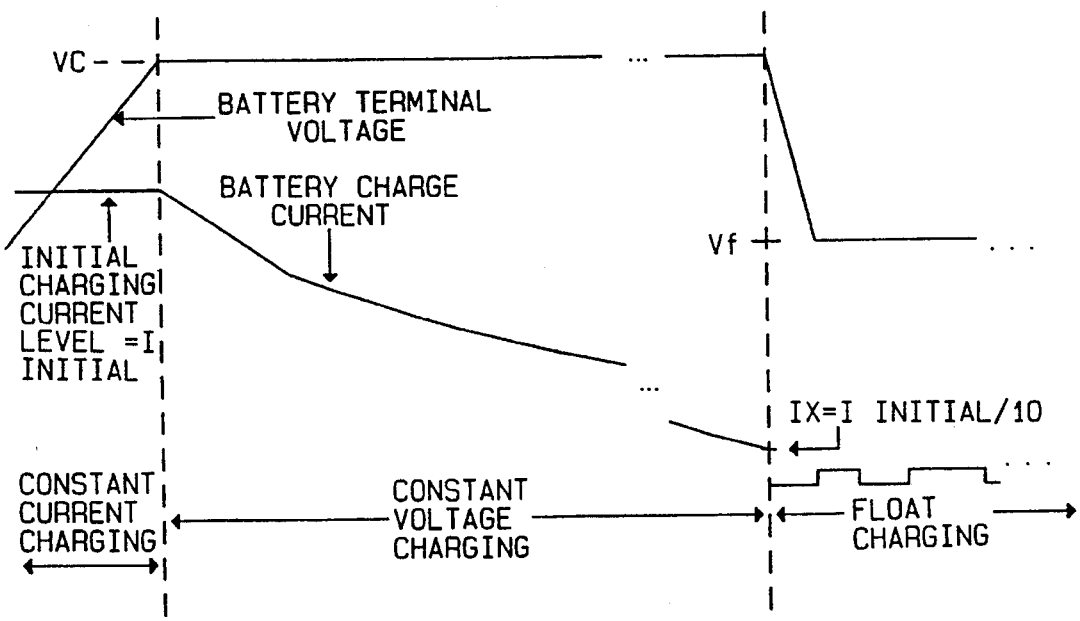
FIG. 4 is a chart showing sequential operations of a prior art charger for lead acid batteries.

Referring to FIG. 2A, the sequential steps begin with a constant current charging phase 1 as indicated at a block 202 labeled ACTIVATE CONSTANT CURRENT FEEDBACK MODE OUTPUT. Initially it is determined whether a high power or low power charging output is used as indicated at a decision block 204. When high power, then the microprocessor PWM0 is set as indicated at a block 206 labeled SET PWM0 WITH INITIAL VALUE. Then the high-power charging output is activated as indicated at a block 208 labeled ACTIVATE HIGH-POWER CHARGING OUTPUT. Otherwise, when low power is identified at block 204, then a lower initial value is set for the PWM0 as indicated at a block 210 labeled SET PWM0 WITH LOWER INITIAL VALUE. Then low-power charging output is activated as indicated at a block 212 labeled ACTIVATE LOW-POWER CHARGING OUTPUT. Then the battery charging circuit 24 is turned on as indicated at a block 214 labeled TURN ON CHARGER.

Figure 2B:
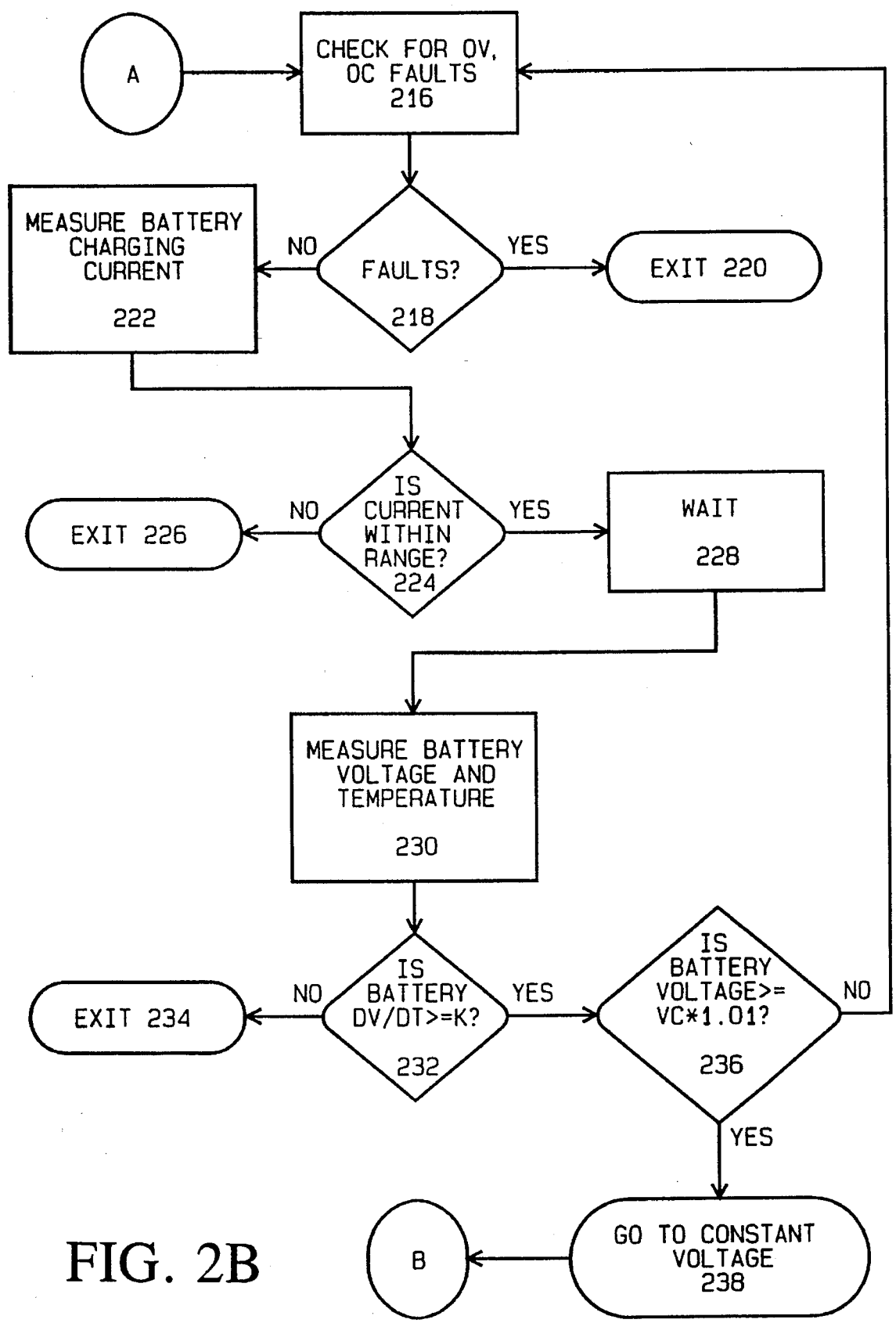

Referring to FIG. 2B, next tests for overvoltage and overcurrent faults are performed as indicated at a block 216 labeled CHECK FOR OV, OC FAULTS. Then any faults are identified as indicated at a decision block 218 labeled FAULTS? If a fault is identified, then the charging routine is exited at block 220. Otherwise, when no faults are identified at decision block 218, the battery charging current is measured as indicated at a block 222 labeled MEASURE BATTERY CHARGING CURRENT. The measured current is compared with a normal range as indicated at a decision block 224 labeled IS CURRENT WITHIN RANGE? If the current is not within the normal range, then the charging routine is exited at block 226. When measured charging current within the normal range is identified at decision block 224, then a predetermined time delay, such as ¼ second is identified as indicated at a block 228 labeled WAIT. Next the battery voltage and temperature are measured as indicated at a block 230 labeled MEASURE BATTERY VOLTAGE AND TEMPERATURE. Then the rate of change of battery voltage is compared with a predetermined threshold value K as indicated at a decision block 232 labeled IS BATTERY DV/DT≧K? When the rate of change of the battery voltage is less than the threshold value K, then the charging routine is exited at block 234. Otherwise, when the rate of change of the battery voltage is greater than or equal to the threshold value K, then the battery voltage is compared with a predetermined value VC as indicated at a decision block 236 labeled IS BATTERY VOLTAGE ≧VC*1.01? VC is a temperature-dependent constant voltage value that lead acid batteries must maintain while they are in constant voltage charging mode for effective charging. For the constant current charging phase 1 illustrated in FIGS. 2A–2B, the current controlled battery charging operation generally is the same as traditional battery charging. The current into the battery 14 is constant and the battery voltage increases as more charge is forced into the battery. When the microprocessor 12 senses that the battery voltage has reached the predetermined value (VC*1.01), the sequential operations continue with the constant voltage phase as indicated at a block 238 labeled GO TO CONSTANT VOLTAGE.

Figure 2C:
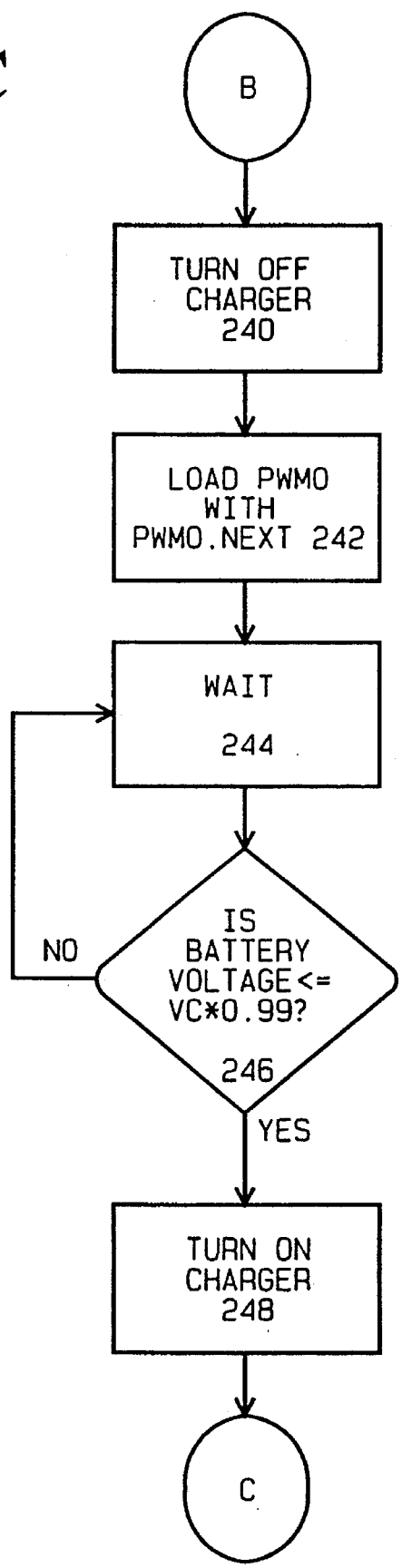

Referring to FIG. 2C, the sequential steps begin with the charging circuit 24 being shut off in the constant voltage charging phase as indicated at a block 240 labeled TURN OFF CHARGER. This will cause the battery voltage to drop. While the battery voltage is dropping, the microprocessor will load PWM0 with a new value as indicated at a block 242 labeled LOAD PWM0 WITH PWM0.NEXT. This new value PWM0.NEXT will cause the Vref input to E/A 28 to be 90% of its previous value so that the battery charging current will be 90% of its previous value. Next a predetermined time delay is provided as indicated at a block 244 labeled WAIT. Then the battery voltage is compared with a predetermined value (VC*0.99) as indicated at a decision block 246 labeled IS BATTERY VOLTAGE ≦VC*0.99? When the microprocessor 12 senses the battery voltage has dropped to the predetermined value (VC*0.99), the charging is turned on with the new amplitude of charging current at 90% of the previous value as indicated at a block labeled 248 TURN ON CHARGER.

Figure 2D:
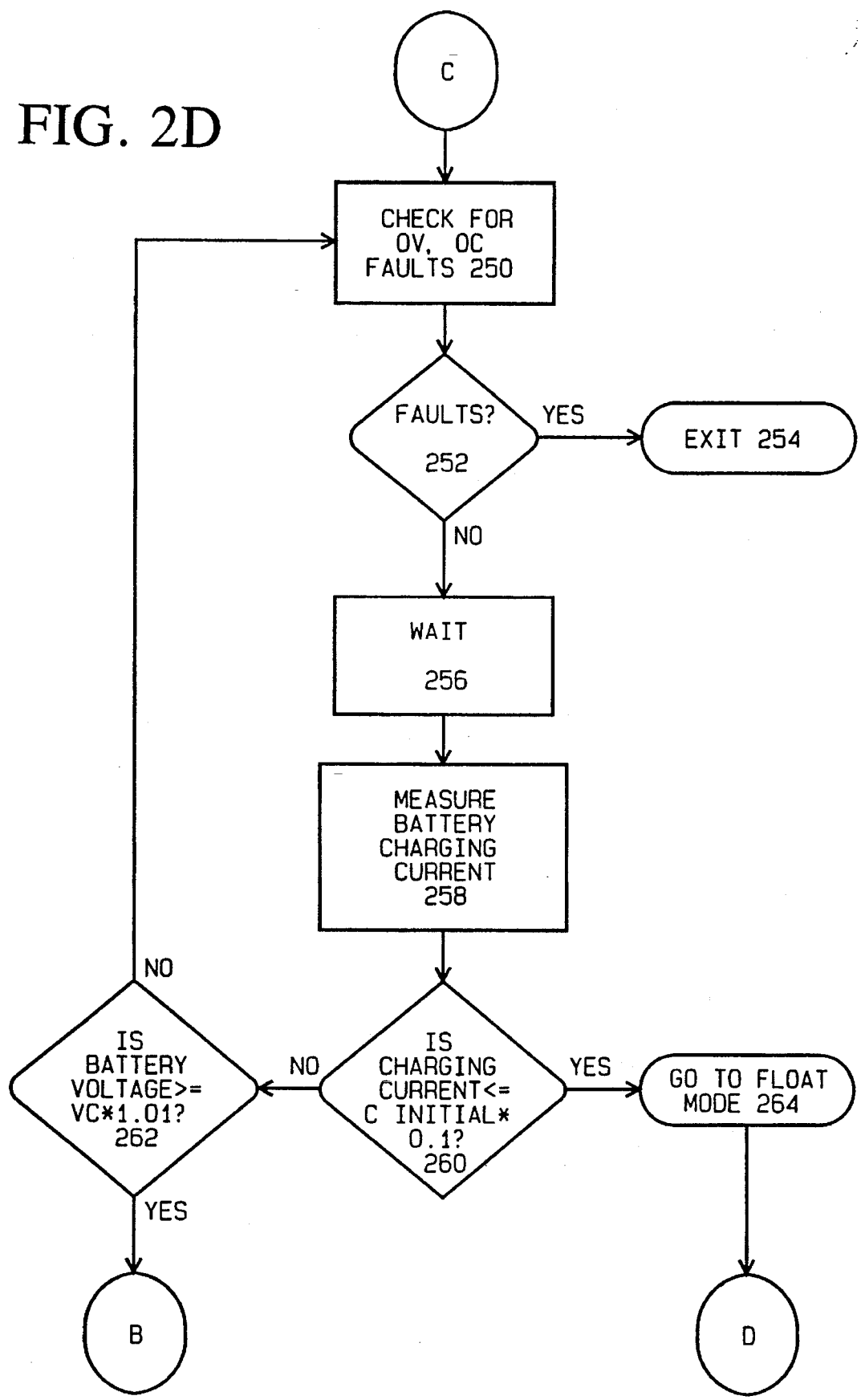

Referring to FIG. 2D, next tests for overvoltage and overcurrent faults are performed as indicated at a block 250 labeled CHECK FOR OV, OC FAULTS. Then any faults are identified as indicated at a decision block 252 labeled FAULTS? If faults are identified, the routine is exited at a block 254 labeled EXIT. Then, if no faults are identified, a predetermined time delay, such as ¼ second, is identified as indicated at a block 256 labeled WAIT. Battery charging current is measured as indicated at a block 258 labeled MEASURE BATTERY CHARGING CURRENT. Then the measured charging current is compared with a predetermined value as indicated at a decision block 260 labeled IS CHARGING CURRENT ≦C INITIAL*0.1? When the measured charging current is greater than the predetermined value, then the battery voltage is compared with the value VC*1.01 as indicated at a decision block 262 labeled IS BATTERY VOLTAGE ≧VC*1.01? When the battery voltage is less than VC*1.01, operations return to check for overvoltage and overcurrent faults at block 250. Otherwise, when the sensed battery voltage equals VC*1.01, the sequential operations return to block 240 in FIG. 2C and the charger 24 is turned off, new values are loaded into PWM0 (90% of the previous value) at block 242, and the charging is turned on at block 248 when the battery voltage is sensed to be at VC*0.99 at decision block 246. These sequential steps continue until the battery current is sensed by the microprocessor 12 to be at a predetermined value of IX, for example, 1/10 of the initial charging current. Then the sequential operations continue with the float voltage charging mode as indicated at a block 264 labeled GO TO FLOAT MODE. Decreasing the battery charging current by 10% for each interaction forces the battery current envelope to look like a decaying exponential waveform, as shown in FIG. 3. This is similar to phase 2 or constant voltage charging of conventional battery charging arrangements, except the battery voltage is not directly controlled by circuit 10. For this constant voltage charging mode or phase 2 illustrated in FIGS. 2C–2D, the only variable that is real-time controlled is the battery charging current. The constant voltage charging mode of the present invention eliminates control circuit oscillation due to battery phase lag variation and results in a more stable operation of charger 24 during constant voltage charging.

Figure 2E:
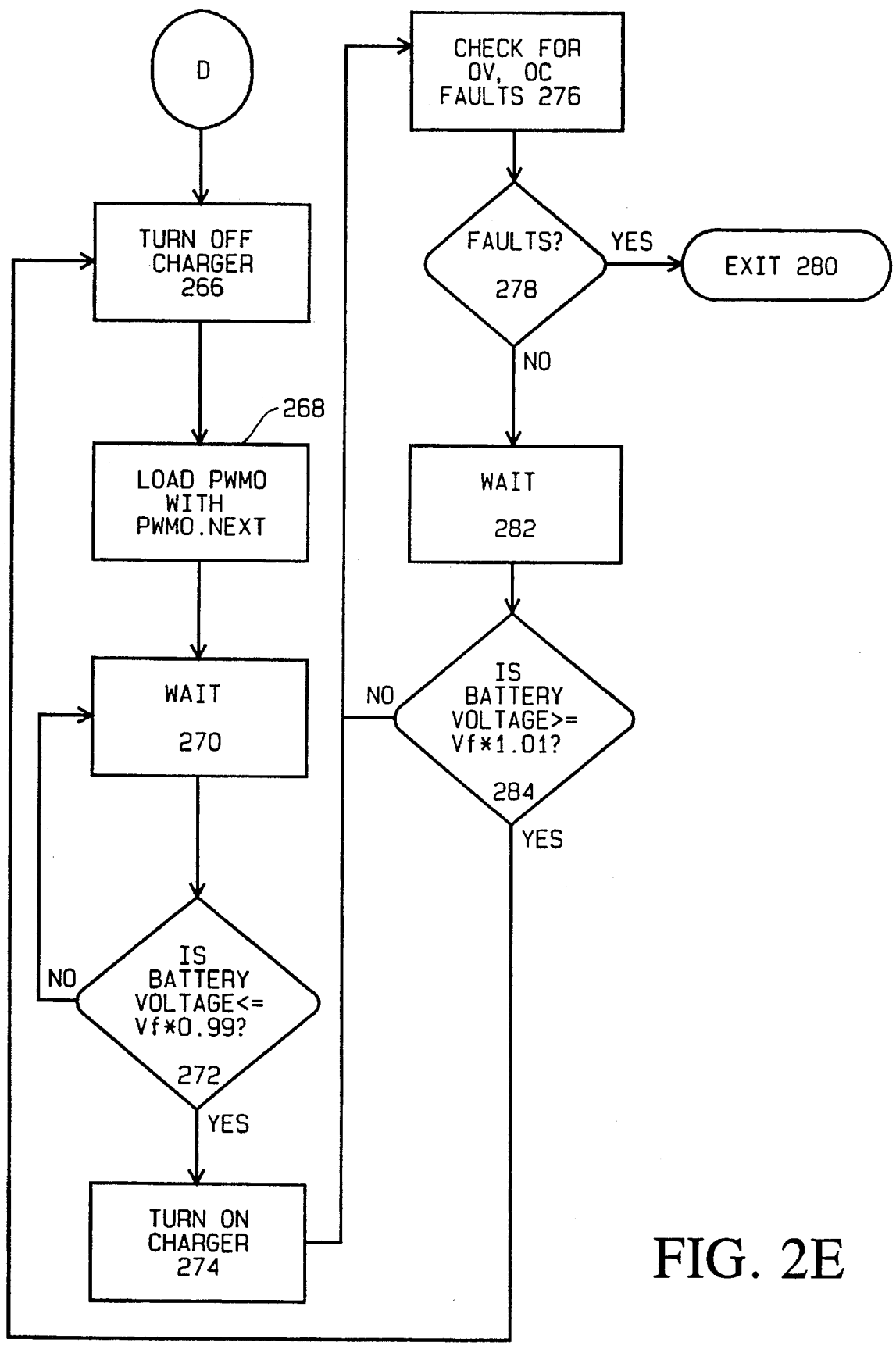

Referring to FIG. 2E, after the microprocessor senses the battery current at or below the predetermined minimum value IX, then the float voltage charging mode begins with the charger 24 being shut off at a block 266 labeled TURN OFF CHARGER. Then the microprocessor loads PWM0 with a new value as indicated at a block 268 labeled LOAD PWM0 WITH PWM0.NEXT. Then a predetermined time delay, such as ¼ second, is identified as indicated at a block 270 labeled WAIT. Then the measured battery voltage is compared with a predetermined value Vf*0.99 as indicated at a block 272 labeled IS BATTERY VOLTAGE ≦Vf*0.99? Vf is a temperature-dependent value that lead acid batteries advantageously maintain during a float charging mode. The battery voltage is allowed to drop until it reaches the predetermined value Vf*0.99. When the battery voltage is sensed to be at Vf*0.99, the microprocessor 12 turns on the battery charger 24 with the same values for PWM0 unchanged from the previous iteration as indicated at a block 274 labeled TURN ON CHARGER. Next tests for overvoltage and overcurrent faults are performed as indicated at a block 276 labeled CHECK FOR OV, OC FAULTS. Then any faults are identified as indicated at a decision block 278 labeled FAULTS? If a fault is identified, then the charging routine is exited at block 280. Otherwise, when no faults are identified at decision block 278, after a time delay as indicated at a block 282 labeled WAIT, the battery voltage is compared with a predetermined value Vf*1.01 as indicated at a decision block 284 labeled IS BATTERY VOLTAGE ≧Vf*1.01? When the battery voltage is sensed to be Vf*1.01, the sequential operations return to block 266 and battery charging is turned off to allow the battery voltage to fall to Vf*0.99. If for some reason the battery voltage does not reach the target voltage Vf*1.01 after a given timed period, for example as a result of a bad battery, the charging will stop and an error will be logged to the system in which the battery pack resides. When the battery voltage is sensed at Vf*0.99, the battery charging is turned on with the fixed value for PWM0. This process continues uninterrupted until the battery is discharged by a system request for energy back-up. This process is very similar to float charging phase 3 of conventional battery chargers, except instead of feeding back the battery voltage, only the battery current is directly controlled by the charging feedback loop. This results in a more stable charging during float charging.

It should be understood that the microprocessor 12 can be replaced with analog and logic circuits. Also it is possible to reproduce the function of the analog high-frequency switching power supply charging circuit 24 using the PWM0 output of the microprocessor to drive the switching FET 32 directly. With available microprocessor devices, the maximum switching frequency of the battery charging power supply running directly from the microprocessor would be approximately 20 Khz. The preferred arrangement of circuit 10 includes the analog high-frequency switching power supply charging circuit 24 so the charging circuit 10 can operate at higher frequencies, such as 100 Khz. In general, faster switching frequencies result in smaller components for power supplies.

In brief summary, the lead acid battery charging circuit 10 does not control the battery voltage in a real-time mode. The current controlled charging circuit 10 of the present invention results in stable charging of lead acid batteries for all battery conditions. The current controlled charging circuit 10 of the present invention is superior to prior art battery chargers in that prior art battery chargers cannot guarantee stable charging for all conditions.

While the invention has been described with reference to details of the illustrated embodiments, these details are not intended to limit the scope of the invention as defined in the appended claims.

What is claimed and desired to be secured by Letters Patent of the United States is:

1. A method for charging a battery using current control with a switching power supply charging circuit coupled to the battery comprising the steps of:

applying a predetermined charging current to the battery during a first charging phase;

applying a sequence of charging current pulses to the battery during a second charging phase; and responsive to a battery charging current equal to said predefined minimum amplitude threshold value for continuing with a third charging phase; and applying predetermined charging current pulses to the battery during said third charging phase, said predetermined charging current pulses having a selected amplitude value substantially less than an amplitude value of said predetermined charging current applied during said first charging phase.

2. A method as recited in claim 1 wherein said step of applying a sequence of charging current pulses to the battery during a second constant voltage charging phase includes the steps of:

applying a first charging pulse having a predetermined amplitude;

measuring and comparing the battery voltage with a first predetermined value;

turning off the switching power supply charging circuit when the battery voltage reaches said predetermined value and loading a next charging pulse amplitude value;

measuring and comparing the battery voltage with a second predetermined value;

turning on the switching power supply charging circuit when the battery voltage reaches said second predetermined value and applying a next charging pulse having said next charging pulse amplitude value; and comparing said next charging pulse with a predetermined minimum amplitude value.

3. A method as recited in claim 2 further includes the steps of sequentially repeating said steps of measuring the battery voltage and turning off and on said switching power supply charging circuit and applying a next charging pulse until said compared next charging pulse is equal to or less than said predetermined minimum amplitude value.

4. A method as recited in claim 2 wherein said step of applying predetermined charging current pulses to the battery during a third charging phase includes the steps of applying said predetermined charging current pulses having said predetermined minimum amplitude value and equal to said selected amplitude value to the battery.

5. A method as recited in claim 1 wherein said step of applying a first charging current to the battery during a first charging phase further includes the steps of measuring and comparing the battery voltage with a predetermined value and going to said second charging phase responsive to the measured battery voltage equal to said predetermined value.

6. Apparatus for charging a battery using a switching power supply charging circuit coupled to the battery comprising:

current control means for controlling the switching power supply charging circuit to apply a selected charging current to the battery; and voltage monitoring means for measuring and comparing the battery voltage with predetermined threshold values and turning off and on said switching power supply charging circuit responsive to the battery voltage reaching said predetermined threshold values;

wherein said current control means includes current feedback means for sensing charging current to the battery, means for comparing said sensed charging current with a selected threshold value, and control means responsive to said comparing means for adjusting charging current; and wherein said current control means includes means for applying a constant current having a predetermined amplitude during a first charging phase; means for applying sequential current pulses having a step-wise decreasing-amplitude during a second charging phase and responsive to a battery charging current equal to a predefined minimum amplitude threshold value for continuing with a third charging phase and means for applying sequential current pulses having a predetermined minimum value during said third charging phase; said predetermined minimum value predetermined charging current pulses having a selected amplitude value substantially less than said predetermined amplitude value of said constant charging current applied during said first charging phase.

7. A battery charging system, said apparatus comprising:

first charging phase means for applying to the battery a first constant charging current having a predetermined amplitude;

means for measuring and comparing the battery voltage with predetermined threshold values;

means responsive to a battery voltage equal to a first predetermined threshold value for continuing with a second charging phase;

second charging phase means for applying to the battery sequentially decreasing-amplitude charging current pulses; said sequentially decreasing-amplitude charging current pulses being applied responsive to the battery voltage reaching predefined first and second predetermined threshold values;

means for comparing the battery charging current with a predefined minimum amplitude threshold value;

means responsive to a battery charging current equal to said predefined minimum amplitude threshold value for continuing with a third charging phase; and third charging phase means for applying to the battery sequential charging current pulses having said predefined minimum amplitude threshold value; said predetermined minimum amplitude value being substantially less than said predetermined amplitude value of said constant charging current applied during said first charging phase.

* * * * *